(12) United States Patent
Marko et al.

(10) Patent No.: US 7,505,745 B1
(45) Date of Patent: Mar. 17, 2009

(54) INTEROPERABLE SATELLITE DIGITAL AUDIO RADIO SERVICE (SDARS) RECEIVER ARCHITECTURE

(75) Inventors: Paul Marko, Pembrone Pines, FL (US); David L. Brown, Lake Worth, FL (US); Craig Wadin, Sunrise, FL (US)

(73) Assignee: XM Satellite Radio, Inc., Washington, DC (US)

( * ) Notice: Subject to any disclaimer, the term of this patent is extended or adjusted under 35 U.S.C. 154(b) by 0 days.

(21) Appl. No.: 09/318,031

(22) Filed: May 25, 1999

(51) Int. Cl.
    *H04B 7/08* (2006.01)
(52) U.S. Cl. .................. 455/132; 455/3.02; 455/427; 455/13.1
(58) Field of Classification Search ............ 455/12.1, 455/427, 13.1, 13.2, 552, 168.1, 169.1, 170.1, 455/132, 3.02
    See application file for complete search history.

(56) References Cited

U.S. PATENT DOCUMENTS

| | | | | |
|---|---|---|---|---|
| 5,101,416 A | * | 3/1992 | Fenton et al. | 375/150 |
| 5,339,459 A | * | 8/1994 | Schiltz et al. | 455/333 |
| 5,732,330 A | * | 3/1998 | Anderson et al. | 455/76 |
| 5,784,418 A | * | 7/1998 | Sykes et al. | 375/347 |
| 5,909,469 A | * | 6/1999 | Frodigh et al. | 375/302 |
| 5,940,750 A | * | 8/1999 | Wang | 455/318 |
| 5,963,582 A | * | 10/1999 | Stansell, Jr. | 375/148 |
| 6,115,366 A | * | 9/2000 | Campanella et al. | 370/319 |
| 6,606,307 B1 | * | 8/2003 | Chang et al. | 370/316 |
| 6,658,237 B1 | * | 12/2003 | Rozenblit et al. | 455/83 |

* cited by examiner

*Primary Examiner*—Temica M. Beamer
(74) *Attorney, Agent, or Firm*—Benman, Brown & Williams

(57) ABSTRACT

An interoperable receiver adapted to receive signals in multiple SDARS bands. The advantageous operation is afforded by the design of the receiver by which an entire band consisting of multiple carriers is received at one time. Receipt and processing of each SDARS band signals is then effectuated by retuning a synthesizer as necessary. In the illustrative embodiment, the invention further includes circuitry for simultaneously receiving first and second ensembles. The first ensemble including a first signal from a first source, a first signal from a second source and a first signal from a third source. The second ensemble including a second signal from the first source, a second signal from the second source and a second signal from the third source. In a preferred embodiment, the inventive receiver is adapted to receive and output audio signals along with data signals simultaneously.

23 Claims, 12 Drawing Sheets

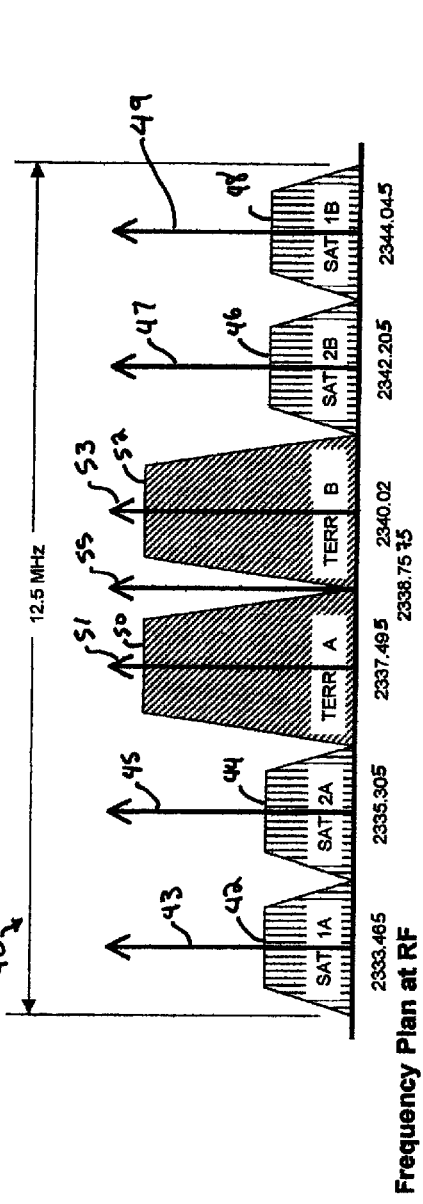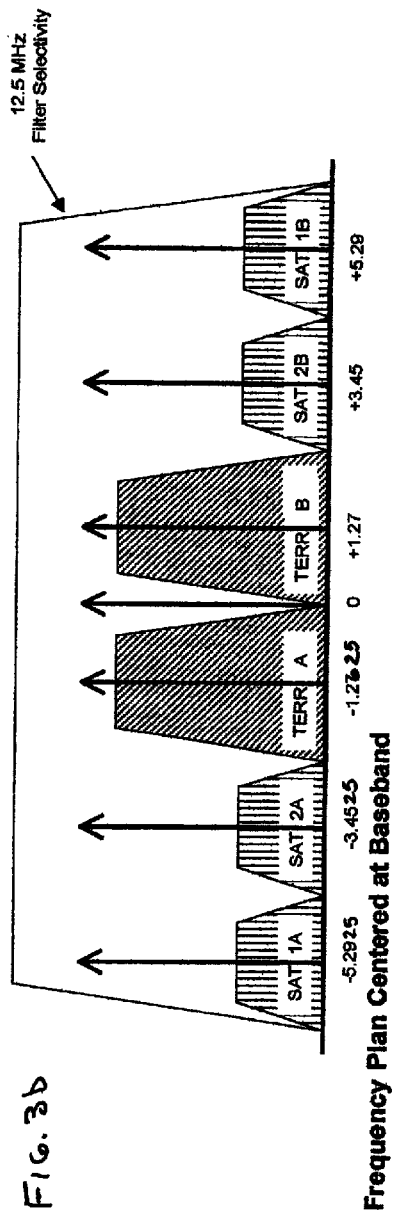

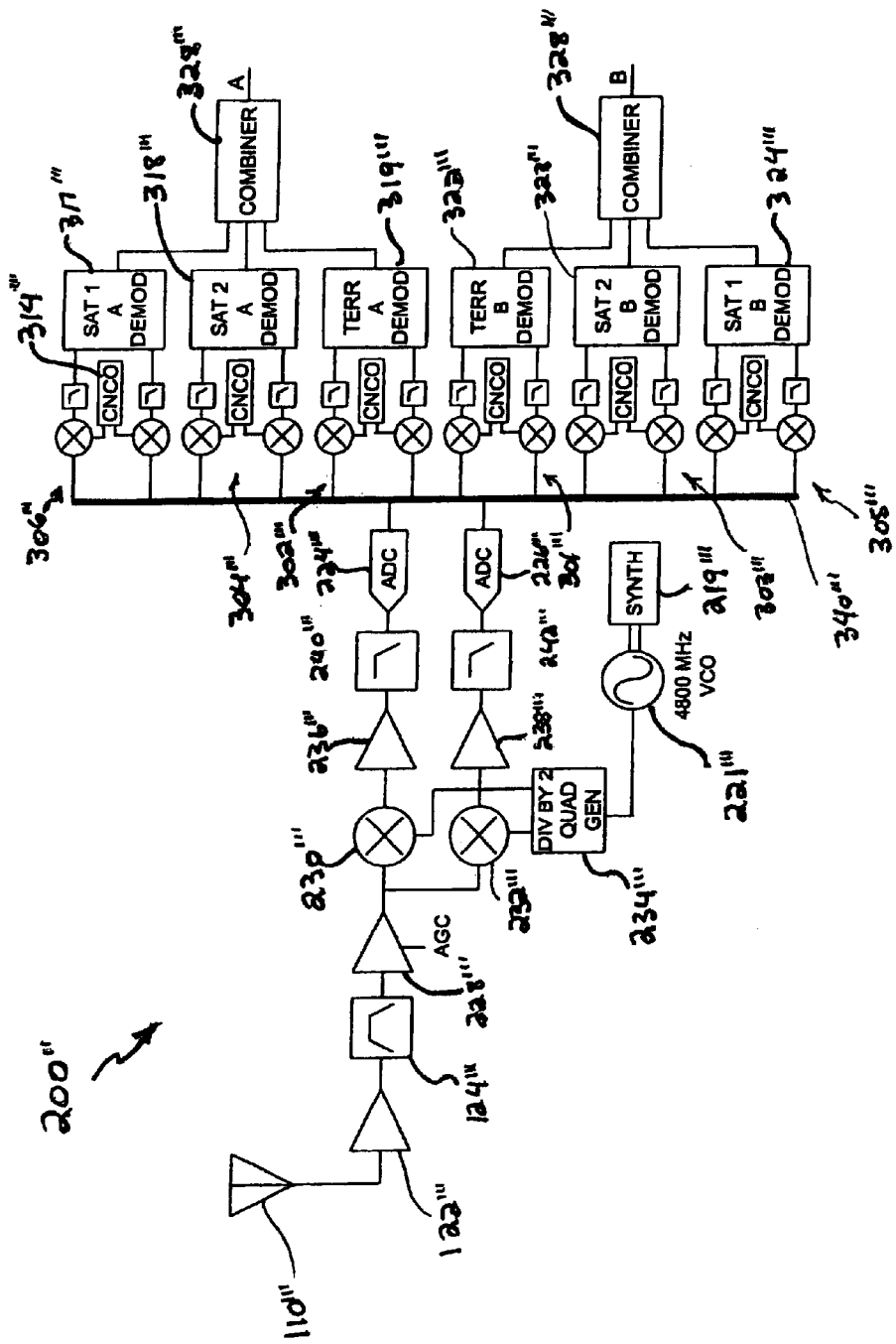

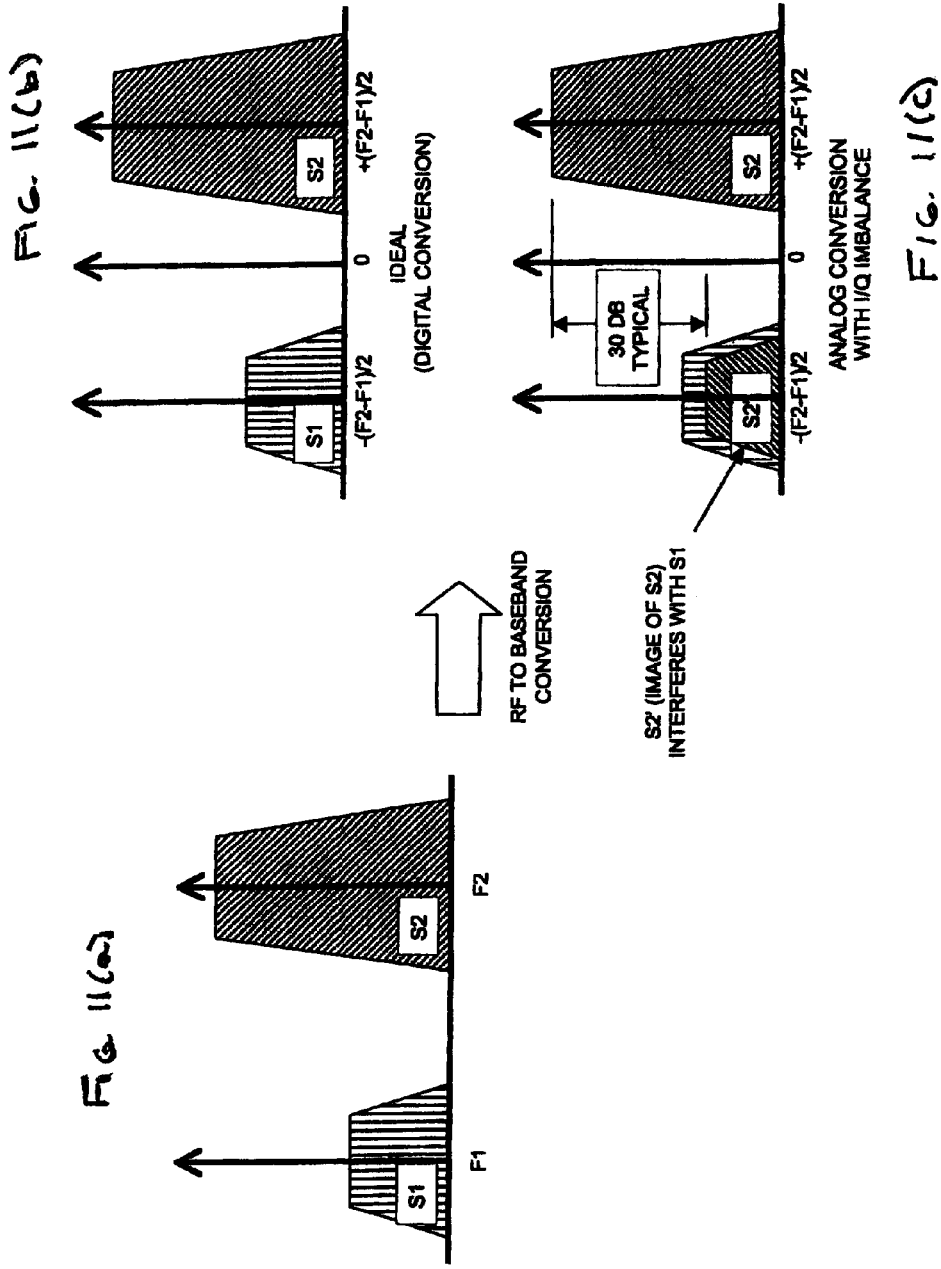

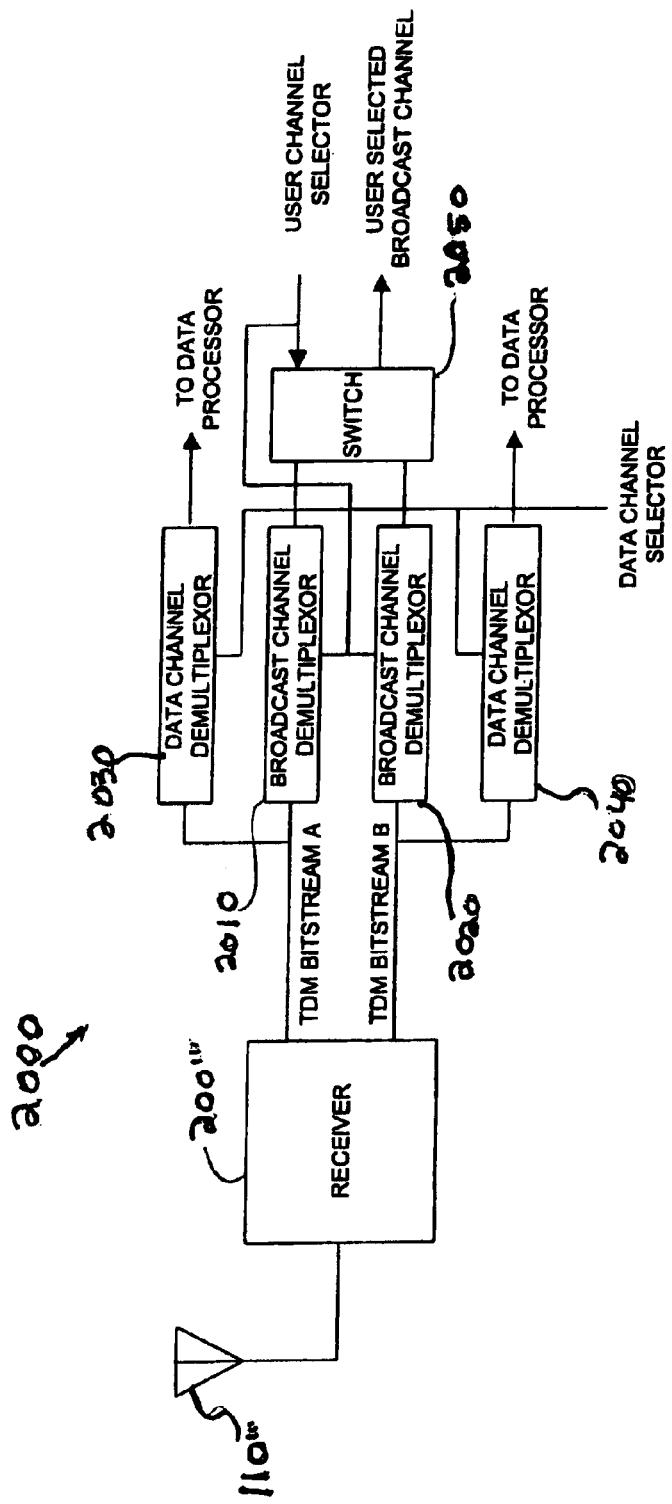

INTEROPERABLE SATELLITE DIGITAL AUDIO RADIO SERVICE (SDARS) RECEIVER ARCHITECTURE

BACKGROUND OF THE INVENTION

1. Field of the Invention

The present invention relates to communications systems. More specifically, the present invention relates to satellite digital audio service (SDARS) receiver architectures.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Satellite radio operators will soon provide digital quality radio broadcast services covering the entire continental United States. These services intend to offer approximately 100 channels, of which nearly 50 channels will be commercial-free or nearly commercial free music with the remaining stations offering news, sports, talk and data channels. According to C. E. Unterberg, Towbin, satellite radio has the capability to revolutionize the radio industry, in the same manner that cable and satellite television revolutionized the television industry.

Satellite radio has the ability to improve terrestrial radio's potential by offering a better audio quality, greater coverage and fewer commercials. Accordingly, in October of 1997, the Federal Communications Commission (FCC) granted two national satellite radio broadcast licenses. The FCC allocated 25 megahertz (MHz) of the electro-magnetic spectrum for satellite digital broadcasting, 12.5 MHz of which are owned by CD Radio and 12.5 MHz of which are owned by the assignee of the present application "XM Satellite Radio Inc.".

The system plan for each licensee presently includes transmission of substantially the same program content from two or more geosynchronous or geostationary satellites to both mobile and fixed receivers on the ground. In urban canyons and other high population density areas with limited line-of-sight (LOS) satellite coverage, terrestrial repeaters will broadcast the same program content in order to improve coverage reliability. Some mobile receivers will be capable of simultaneously receiving signals from two satellites and one terrestrial repeater for combined spatial, frequency and time diversity, which provides significant mitigation against multipath and blockage of the satellite signals. In accordance with XM Radio's unique scheme, the 12.5 MHz band will be split into 6 slots. Four slots will be used for satellite transmission. The remaining two slots will be used for terrestrial re-enforcement.

In accordance with the XM frequency plan, each of two geostationary Hughes 702 satellites will transmit identical or at least similar program content. The signals transmitted with QPSK modulation from each satellite (hereinafter satellite1 and satellite2) will be time interleaved to lower the short-term time correlation and to maximize the robustness of the signal. For reliable reception, the LOS signals transmitted from satellite1 are received, reformatted to Multi-Carrier Modulation (MCM) and rebroadcast by non-line-of-sight (NLOS) terrestrial repeaters. The assigned 12.5 MHz bandwidth (hereinafter the "XM" band) is partitioned into two equal ensembles or program groups A and B. The use of two ensembles allows 4096 Mbits/s of total user data to be distributed across the available bandwidth. Each ensemble will be transmitted by each satellite on a separate radio frequency (RF) carrier. Each RF carrier supports up to 50 channels of music or data in Time Division Multiplex (TDM) format. With terrestrial repeaters transmitting an A and a B signal, six total slots are provided, each slot being centered at a different RF carrier frequency. The use of two ensembles also allows for the implementation of a novel frequency plan which affords improved isolation between the satellite signals and the terrestrial signal when the receiver is located near the terrestrial repeater.

In accordance with the CD Radio frequency plan, the 12.5 MHz band will be split into 3 slots. Two slots will be used for satellite transmission. The remaining slot will be used for terrestrial re-enforcement. The FCC has further mandated the development of interoperable receivers for satellite radio reception, i.e. receivers capable of processing signals from either CD Radio or XM Radio broadcasts. In order to comply with the FCC mandate to develop interoperable receivers, conventional satellite receiver architectures will require replicate analog signal paths and filters to process the various signal bandwidths associated with each assignees frequency plan. As a result, interoperable receivers constructed in accordance with conventional teachings will have substantially larger size and higher cost than non-interoperable receivers.

Thus, there is a need in the art for a low cost, interoperable satellite radio receiver architecture capable of receiving both the XM Radio band and the CD Radio band.

SUMMARY OF THE INVENTION

The need in the art is addressed by the system and method of the present invention. The inventive system includes an interoperable receiver adapted to receive signals in the XM band and the CD band. The advantageous operation is afforded by the design of the receiver by which an entire band consisting of multiple carriers is received at one time. Receipt and processing of XM or CD band signals is then effectuated by retuning a synthesizer as necessary.

In the illustrative embodiment, the invention further includes circuitry for simultaneously receiving first and second ensembles. The first ensemble including a first signal from a first source, a first signal from a second source and a first signal from a third source. The second ensemble including a second signal from the first source, a second signal from the second source and a second signal from the third source.

In a preferred embodiment, the inventive receiver is adapted to receive and output audio signals along with data signals simultaneously.

BRIEF DESCRIPTION OF THE DRAWINGS

FIG. 3a is a diagram which depicts a frequency plan for a two-satellite SDARS broadcast system utilizing the XM band in accordance with the present teachings.

FIG. 3b is a diagram which depicts the frequency plan of FIG. 3a centered at baseband.

FIG. 10 is a block diagram of an alternative preferred embodiment of an SDARS receiver incorporating the teachings of the present invention.

FIG. 11 is a diagram which illustrates the benefits of direct digital conversion.

FIG. 12 is a diagram showing an XM full waveform receiver adapted to receive audio and data simultaneously.

DESCRIPTION OF THE INVENTION

Illustrative embodiments and exemplary applications will now be described with reference to the accompanying drawings to disclose the advantageous teachings of the present invention.

Figure 1:
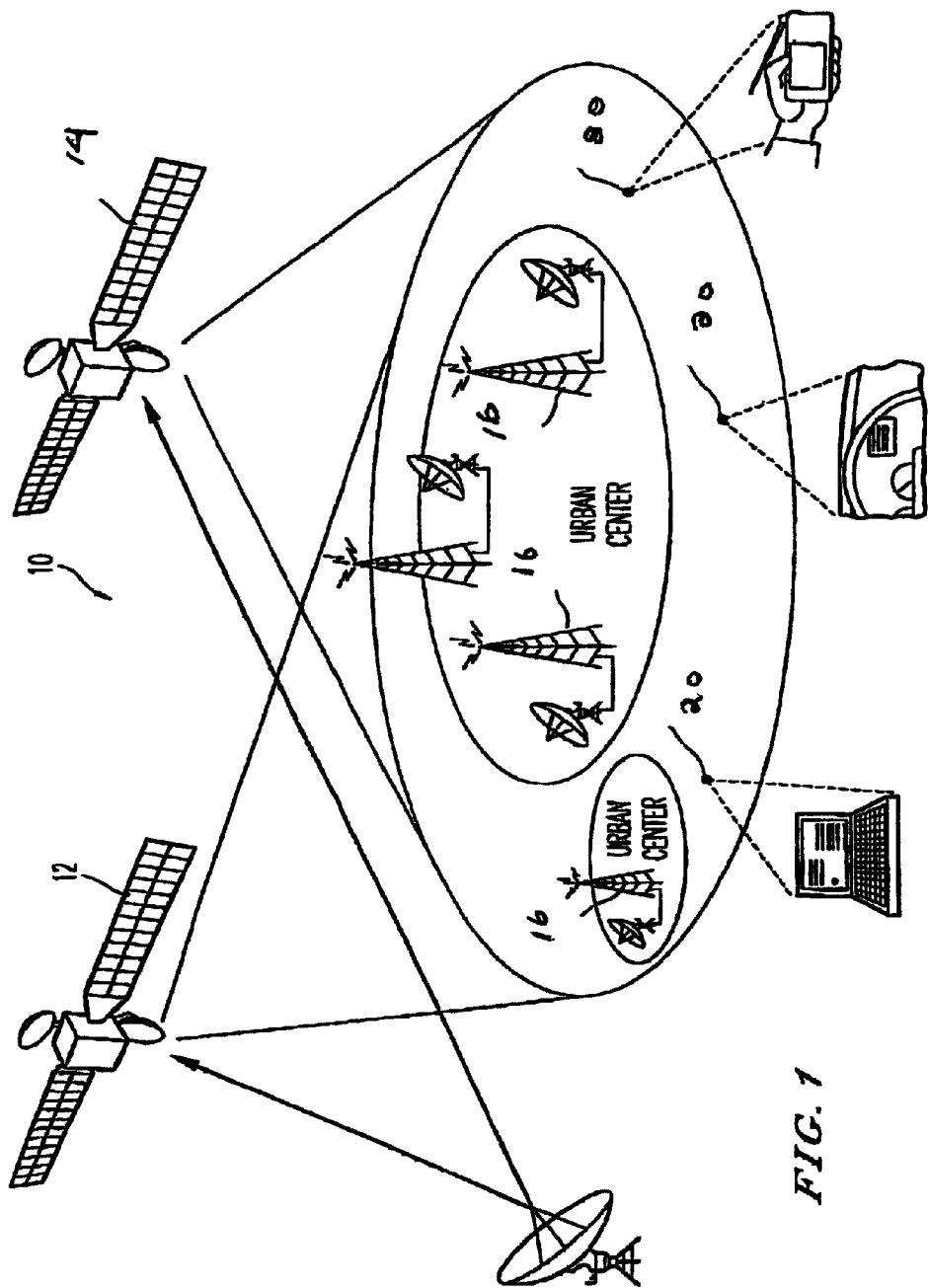
FIG. 1 is an illustrative implementation of a satellite digital audio service (SDARS) system architecture constructed in accordance with the teachings of the present invention.

An illustrative implementation of a satellite digital audio service (SDARS) system architecture is depicted in FIG. 1. The system 10 includes first and second geostationary satellites 12 and 14 which transmit line-of-sight (LOS) signals to SDARS receivers located on the surface of the earth. The satellites provide for interleaving and spatial diversity. (Those skilled in the art will appreciate that in the alternative, the signals from the two satellites could be delayed to provide time diversity.) The system 10 further includes plural terrestrial repeaters 16 which receive and retransmit the satellite signals to facilitate reliable reception in geographic areas where LOS reception from the satellites is obscured by tall buildings, hills, tunnels and other obstructions. The signals transmitted by the satellites 12 and 14 and the repeaters 16 are received by SDARS receiver 20. As depicted in FIG. 1, the receivers 20 may be located in automobiles, handheld or stationary units for home or office use. The SDARS receivers 20 are designed to receive one or both of the satellite signals and the signals from the terrestrial repeaters and combine or select one of the signals as the receiver output as discussed more fully below.

Figure 2:
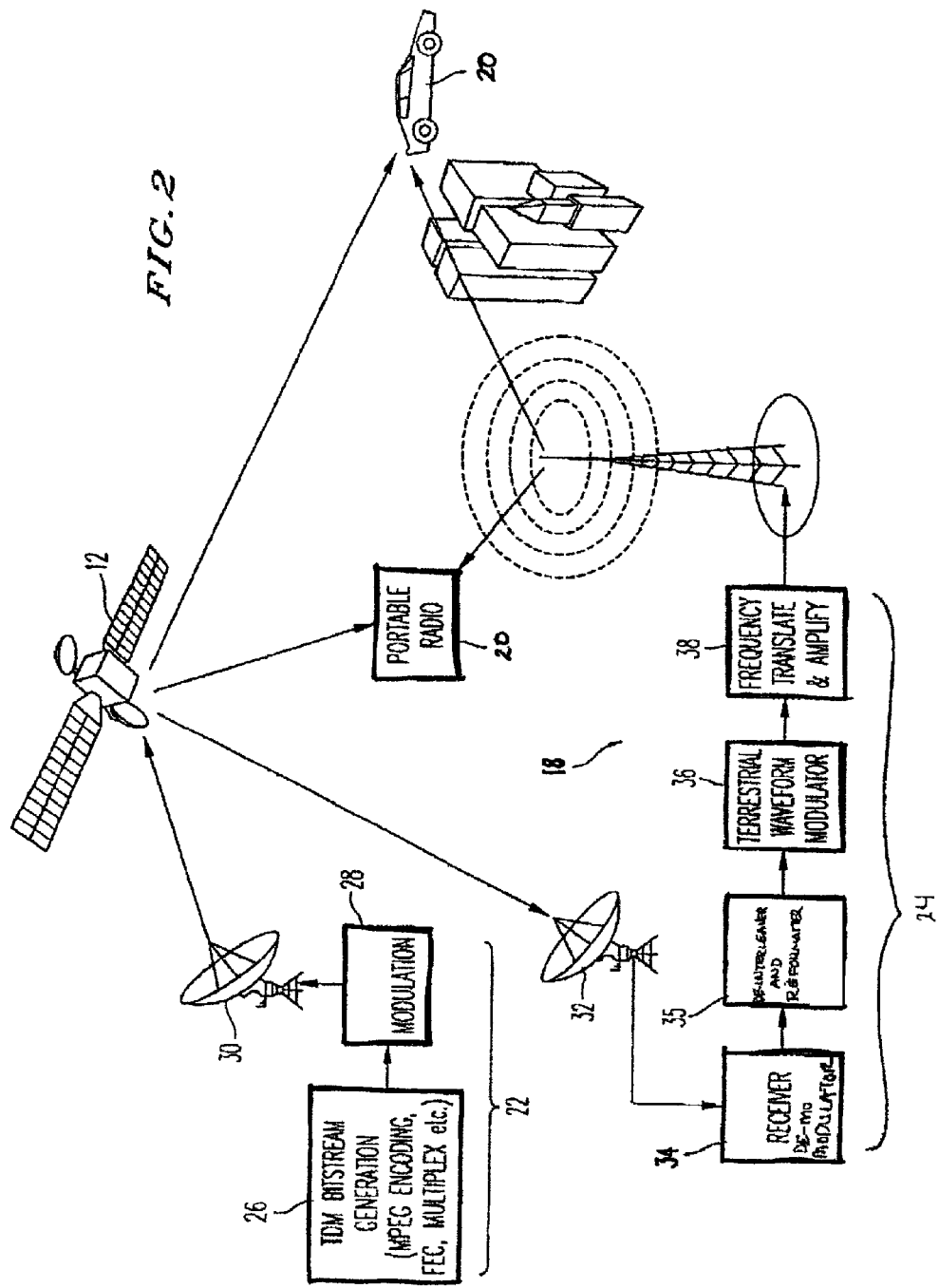
FIG. 2 is a diagram which illustrates the system of FIG. 1 in greater detail.

FIG. 2 is a diagram which illustrates the system 10 of FIG. 1 in greater detail with a single satellite and a single terrestrial repeater. FIG. 2 shows a broadcast segment 22 and a terrestrial repeater segment 24. In the preferred embodiment, an incoming bit stream is encoded into a time division multiplexed (TDM) signal using a coding scheme such as MPEG by an encoder 26 of conventional design. The TDM bit stream is upconverted to RF by a conventional quadrature phase-shift keyed (QPSK) modulator 28. The upconverted TDM bit stream is then uplinked to the satellites 12 and 14 by an antenna 30. Those skilled in the art will appreciate that the present invention is not limited to the broadcast segment shown. Other systems may be used to provide signals to the satellites without departing from the scope of the present teachings.

The satellites 12 and 14 act as bent pipes and retransmit the uplinked signal to terrestrial repeaters 18 and portable receivers 20. As illustrated in FIG. 2, the terrestrial repeater includes a receiver demodulator 34, a de-interleaver and reformatter 35, a terrestrial waveform modulator 36 and a frequency translator and amplifier 38. The receiver and demodulator 34 downconverters the downlinked signal to a TDM bitstream. The de-interleaver and reformatter 35 reorders the TDM bitstream for the terrestrial waveform. The digital baseband signal is then applied to a terrestrial waveform modulator 36 (e.g. MCM or multiple carrier modulator) and then frequency translated to a carrier frequency prior to transmission.

As will be appreciated by those skilled in the art, the strength of the signal received close to the terrestrial repeaters will be higher than that received at a more distant location. A concern is that the terrestrial signal might interfere with the reception of the satellite signals by the receivers 30. For this reason, in the best mode, a novel frequency plan such as that described below is utilized.

FIG. 3a is a diagram which depicts a frequency plan for a two-satellite SDARS broadcast system utilizing the XM band 40 in accordance with the present teachings. Each satellite transmits ensemble A and ensemble B. In accordance with the novel frequency plan of the present invention, two frequency slots 42 and 48 centered at frequencies 43 and 49 are assigned to the first satellite 12 and two frequency slots 44 and 46 centered at frequencies 45 and 47 are assigned to the second satellite 14. In addition, two frequency slots 50 and 52 centered at frequencies 51 and 53 are assigned to the terrestrial repeaters 18. Three frequency slots 42, 44 and 50 each carry identical program content assigned to ensemble A and the three frequency slots 48, 46 and 52 each carry identical program content assigned to ensemble B. As mentioned above, the repeaters 18 retransmit the signals received from satellite 12 as illustrated in FIG. 2.

Returning to FIG. 3a, note that the frequency slots 42 and 48 associated with the satellite 12 are separated from the frequency slots 50 and 52 associated with the terrestrial repeaters 18 by the frequency slots 44 and 46 associated with satellite 14. In this manner, any satellite interference created by a terrestrial repeater transmission will primarily impact only the signal from satellite 14 and not the signal from satellite 12. As will be appreciated by those skilled in this art, this facilitates reliable reception by a receiver even while located in close proximity to a terrestrial repeater.

Figure 4A:
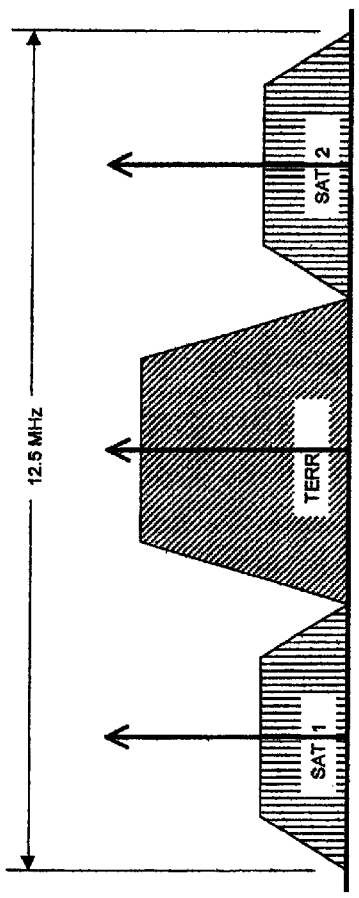
FIG. 4a is a diagram which depicts the CD Radio frequency plan.
Figure 4B:
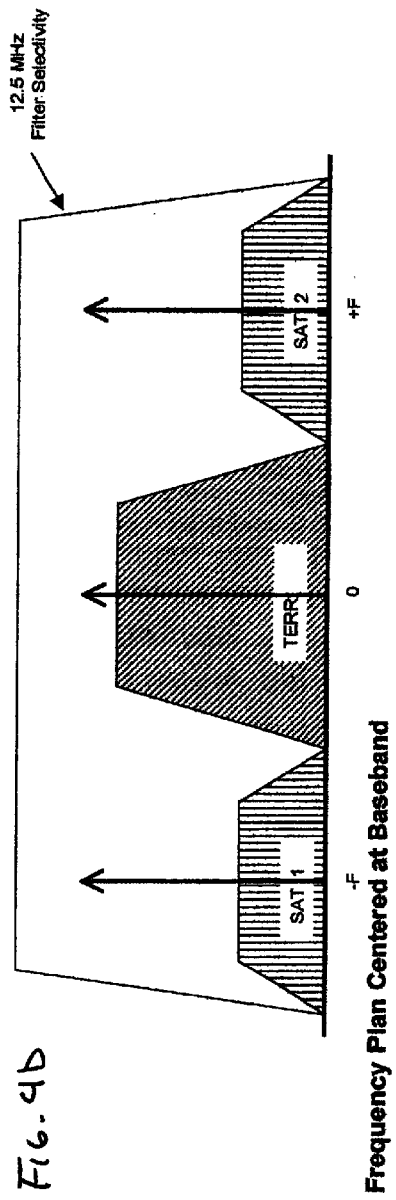
FIG. 4b is a diagram which depicts the CD Radio frequency plan of FIG. 4a centered at baseband.

FIG. 4a is a diagram which depicts the CD Radio frequency plan and FIG. 4b is a diagram which depicts the CD Radio frequency plan of FIG. 4a centered at baseband. As depicted in FIGS. 4a and 4b, the three signals contain identical program content. The terrestrial signal is at the center of the band with the signals from the satellites on either side.

Figure 5:
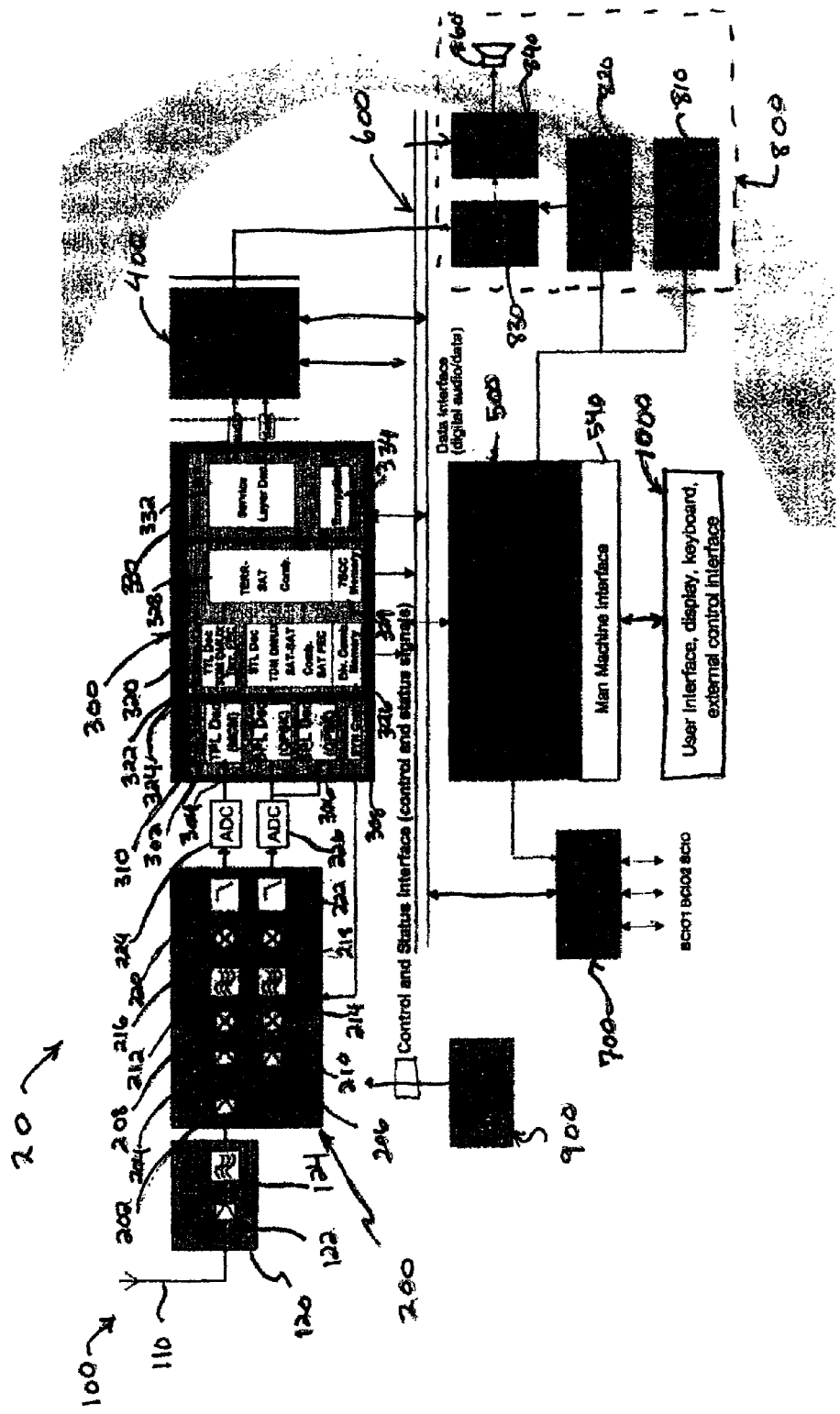
FIG. 5 is a block diagram of an illustrative implementation of an SDARS receiver constructed in accordance with the teachings of the present invention.

FIG. 5 is a block diagram of an illustrative implementation of an SDARS receiver 20 constructed in accordance with the teachings of the present invention. The receiver 20 includes an antenna module 100, an RF tuner module 200, a channel decoder 300, a source decoder 400, a digital control and status interface bus 600, system controller 500, data interface 700, audio output circuit 800, power supply 900, and a user interface 1000.

Figure 6:
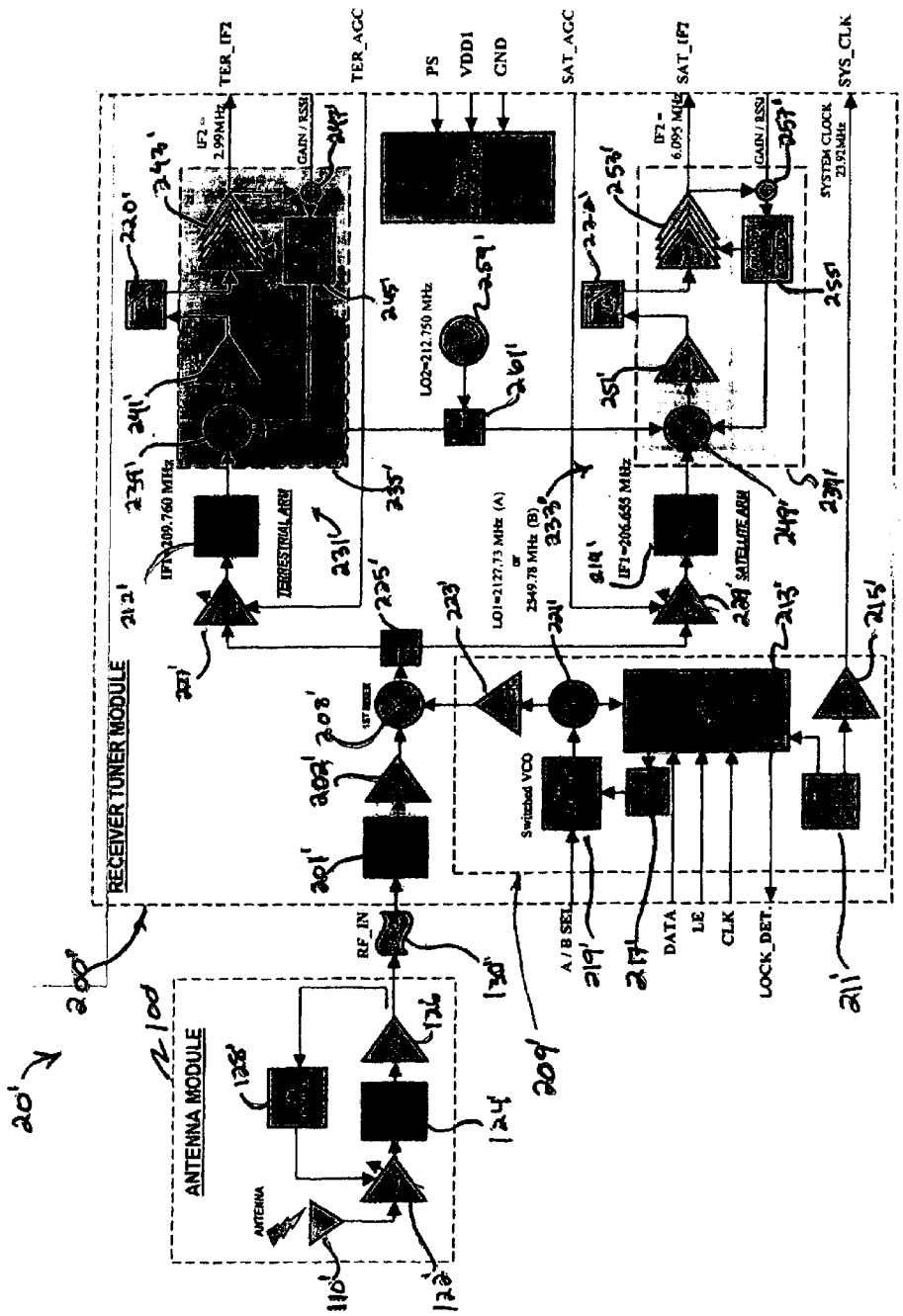
FIG. 6 is a detailed view of a receiver capable of receiving a single ensemble only.

In order to appreciate the present teachings, reference is made to FIG. 6. FIG. 6 is a detailed view of antenna module 100' and tuner module 200' capable of receiving a single ensemble only. In the preferred embodiment, the system disclosed in FIG. 6 is implemented in accordance with the teachings of U.S. patent application Ser. No. 09/435,317, entitled Tuner Architecture for Satellite and Terrestrial Reception of Signals, filed Nov. 4, 1999 by P. Marko and A. Nguyen, the teachings of which are incorporated herein by reference. The signal received by the antenna 110' of the antenna module 100' is amplified by a first low noise amplifier 122' prior to being input to a first image filter 124'. The output of the first image filter 124' is input to a second low noise amplifier 126'. The output of the second low noise amplifier 126' is fed back to the first low noise amplifier 122' via an automatic gain control (AGC) circuit 128' for gain stabilization as will be appreciated by those skilled in the art. The output of the second low noise amplifier 126' constitutes the output of the antenna module 100' and is input to the tuner module 200' via an RF cable 130'.

In the tuner module 200', a second image filter 201' receives the RF signal from the cable 130' and provides an input to a third low noise amplifier 202'. The output of the third low noise amplifier 202' is input to a first mixer 208'. The first mixer is driven by a dual resonator voltage controller oscillator (VCO) 209'. A dual resonator VCO is required in order to switch between the two ensembles. A splitter 225' supplies the output of the first mixer 208' to first and second intermediate frequency (IF) amplifiers 227' and 229'. The first IF amplifier 227' is disposed in a terrestrial repeater signal processing path 231' and the second IF amplifier 229' is disposed in a second satellite signal processing path 233'.

In each path 231' or 233', a surface acoustic wave (SAW) filter 212' or 214', respectively, is disposed. The first SAW filter 212' isolates the signals from a selected ensemble received from a terrestrial repeater. The second SAW filter 214' isolates the signals from a selected ensemble received from both satellites. The output of each SAW filter 212' and 214' is input to a back end integrated circuit (IC) which mixes the filtered signal down from a first intermediate frequency (IF1) to a second intermediate frequency (IF2). For example, for the terrestrial arm 231', IF1 may be 209.760 MHz and IF2 2.99 MHz.

In the satellite arm 233', the SAW filter is adapted to isolate the signals from a selected ensemble received from both satellites. For the satellite arm 233', IF1 may be 206.655 MHz and IF2 6.095 MHz. Those skilled in the art will appreciate that the present invention is not limited to the frequencies illustrated in the present disclosure. The outputs of the back-end ICs 235' and 237' are output to analog-to-digital (A/D) converters as per the embodiment of FIG. 5 for digital processing. A channel decoder 300' (not shown) digitally separates and decodes the two satellite channels.

In addition to the use of a single SAW filter to process the two satellite signals, a novel aspect of the embodiment of FIG. 6 is that since the satellite and terrestrial signals for ensemble A are the mirror image of the satellite and terrestrial signals for ensemble B, both signals can be received by using high side and low side injection into the first mixer 208' using a signal source 221' driven by the switched VCO 219'. See the above-referenced patent application filed by P. Marko and A. Nguyen for a detailed discussion of this feature.

While the architecture of FIG. 6 is well adapted to receive a single ensemble at a time, in order to receive two ensembles at a time, it would be necessary to double the number of back ends (including the first mixer and every component thereafter).

Figure 7:
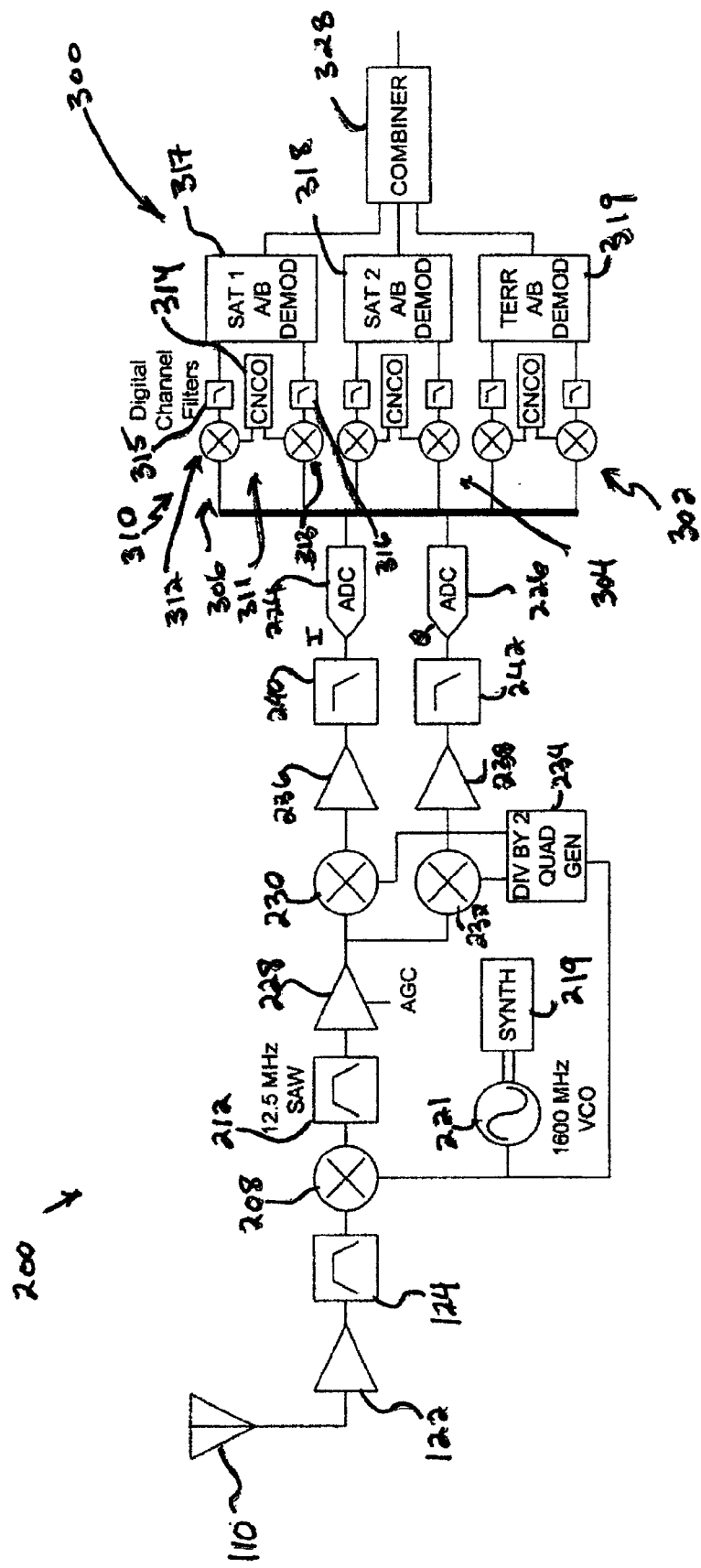
FIG. 7 is a block diagram of a first embodiment of an SDARS receiver of the present invention.

FIG. 7 is a block diagram of a first embodiment of an SDARS receiver of the present invention. In the preferred embodiment, the full 12.5 MHz XM band containing the first and second ensembles are received in the receiver 200 via the antenna 110, a low noise amplifier 122 and an image filter 124 as per FIG. 6. The output of the image filter 124 is input to a first mixer 208. The first mixer 208 is driven by a VCO 221 which, in the illustrative embodiment, operates at a frequency of approximately 1600 MHz. The actual output frequency of the VCO 221 will be substantially equivalent to two-thirds of the center frequency of the full 12.5 MHz frequency band received at the antenna 110. If, for example, the center of the XM 12.5 MHz frequency band is 2338.750 MHz, the VCO should operate at two-thirds of 2338.750 MHz or 1559.167 MHz. The VCO is driven by a synthesizer 219.

The mixer 208 will have an approximate 800 MHz output which, in the illustrative embodiment, is filtered by a 12.5 MHz wide SAW filter 212. Note that the use of a single SAW filter in place of the two SAW filters 212' and 214' of FIG. 6 is one advantage of the implementation of FIG. 7. The SAW filter 212 serves to select the entire XM band 40 (see FIG. 3a) including both ensemble A and ensemble B.

The output of the SAW filter 212 is input to an automatic gain controllable (AGC) amplifier 228. The gain of amplifier 228 is controlled by signal amplitude control stages (not shown) contained in demodulator blocks 317, 318 and 319. The output of the AGC amplifier 228 feeds quadrature mixers 230 and 232. The quad mixers 230 and 232 are driven in-phase at the IF frequency of 800 MHz with injection in quadrature. The injection signal is derived from the 1600 MHz signal output by the VCO 221 via a divide by 2 quad generator 234. Hence, the quad generator 234 serves as a quad local oscillator operating at 800 MHz.

Recall that the output of the SAW filter is centered at 800 MHz in the illustrative embodiment. Consequently, the effect of mixing the output of the SAW filter with an 800 MHz signal is to mix the full 12.5 MHz band centered at the 800 MHz IF output of the SAW filter down to baseband (centered at 0 MHz IF). A graphical representation of this baseband signal can be seen in FIG. 3b. The two frequency slots assigned to satellite 12 are now centered at approximately ±5.2925 MHz, the two slots assigned to satellite 14 are centered at approximately ±3.4525 MHz and the two slots assigned to the terrestrial repeaters are centered at approximately ±1.2625 MHz.

Returning to FIG. 7, the outputs of the quad mixers 230 and 232 are amplified by post-mixer amplifiers 236 and 238 and input to low pass filters 240 and 242, respectively. The quadrature (complex) baseband signals will have a bandwidth from 0 to ±6.25 MHz. Hence, the low pass filters should be designed to have a rolloff at a frequency of approximately 6.25 MHz or higher. The low pass filters 240 and 242 may be implemented with simplicity as one or two stage resistive/capacitive (RC) filters.

The filtered I (in-phase) and Q (quadrature) signals, output by the filters 240 and 242, are digitized by analog to digital converters (ADCs) 224 and 226, respectively. In the illustrative embodiment, the ADCs must at a minimum be capable of digitizing signals in the frequency range of 0 to 6.25 MHz. Those skilled in the art will appreciate that the outputs of the ADCs 224 and 226 constitute a digital complex baseband signal representing both ensembles (A and B) of the XM band and are ready for post processing. This digital representation can be applied to any of a number of digital selectivity elements.

In FIG. 7, the channel decoder 300 is shown as having three branches 302, 304 and 306 for processing the signal from the terrestrial repeater 16, satellite 14 and satellite 12, respectively. Since channel decoder 300 in FIG. 7 contains only three branches, only a single ensemble (A or B) at a time may be decoded. As each branch is similar (the filter bandwidth for the terrestrial repeater is wider than the bandwidth for the satellite), only one is described below for brevity. Each branch includes a complex mixer 311 which may be implemented with two mixers 312 and 313 driven by a complex numerically controlled oscillator CNCO 314. The CNCO 314 is programmed to a frequency at the center of the frequency slot containing the satellite or terrestrial signal the branch is intended to receive. If for example branch 306 is intended to receive ensemble A of satellite 12, CNCO 314 would be tuned to approximately −5.29 MHz. With CNCO 314 tuned to −5.29 MHz and applied to complex mixer 311, the output of complex mixer 311 will contain the frequency slot assigned to ensemble A of satellite 12 centered at 0 MHz.

System controller 500 (of FIG. 5) also serves to select ensemble A or ensemble B for further processing by tuning the CNCO 314 to negative frequencies for ensemble A and to positive frequencies for ensemble B.

The digital low pass filters 315 and 316 act as channel or selectivity filters that remove the components relating to the other frequency slots in the 12.5 MHz band and any other residue that manages to pass the SAW filter 212. Hence, at this point, the signal for each branch for the selected ensemble (A or B) is isolated and ready for demodulation (signal extraction) by demodulators 317, 318, and 319 prior to being applied to a combiner 328. The combiner applies error correction decoding to each of the demodulator outputs and takes the best of the three signals for output.

As illustrated in FIG. 5, in the preferred embodiment, at the transport layer 320 the combiner 328 uses a conventional Viterbi decoder (not shown) on soft decision bits from the first and second satellites 12 and 14 as, in the preferred embodiment, these signals are convolutionally encoded. Next, the Viterbi decoded signals are input to a Reed-Solomon decoder. The Reed-Solomon simply checks the validity or integrity of each codeword and applies corrections to a small percentage of errors. The RS decoded composite satellite signal is then ready for combination with the terrestrial repeater signal. (Those skilled in the art will appreciate that Viterbi decoders and Reed-Solomon decoders are well known in the art.)

Returning to FIG. 7, the stream at the output of the combiner 328 represents the bitstream that is to be multiplexed in the manner described more fully below. Those skilled in the art will appreciate that the receiver of FIG. 7 could be used to receive signals in the other assigned 12.5 Mhz band (presently allocated to CD Radio) by simply tuning to the 'CD' band centered at 2326.25 MHz instead of the XM band centered at 2338.750 Mhz. This would satisfy an FCC requirement that satellite radios be compatible across the entire 25 Mhz digital broadcast spectrum. The digital filters would have to have a wider passband and the demodulators would have be changed to accommodate the CD Radio frequency plan. In an interoperable receiver, these changes could be realized with programmable filters and demodulators or with separate filter and demodulator paths, as will be appreciated by those skilled in the art.

Figure 8:
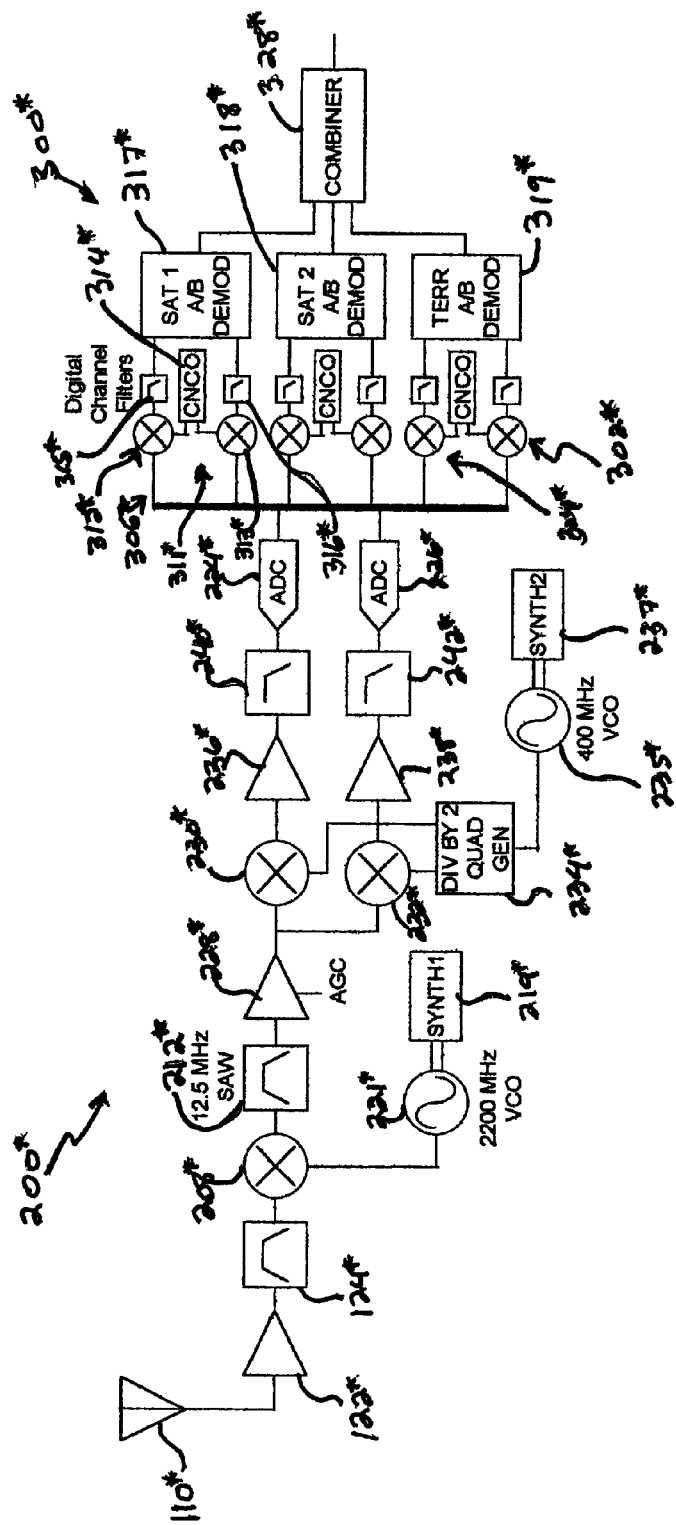
FIG. 8 is an alternative embodiment of the SDARS receiver of FIG. 7.

FIG. 8 is an alternative embodiment of the SDARS receiver of FIG. 7. The embodiment 200\* of FIG. 8 is essentially identical to that of FIG. 7 with the exception of the addition of a second VCO 235\* and a second synthesizer 237\*. In the illustrative embodiment of FIG. 8, the second VCO operates at 400 MHz. The use of two synthesizers eliminates the requirement that the $1^{st}$ LO=⅔ the RF frequency. This allows for a lower frequency $1^{st}$ IF which is programmable.

Figure 9:
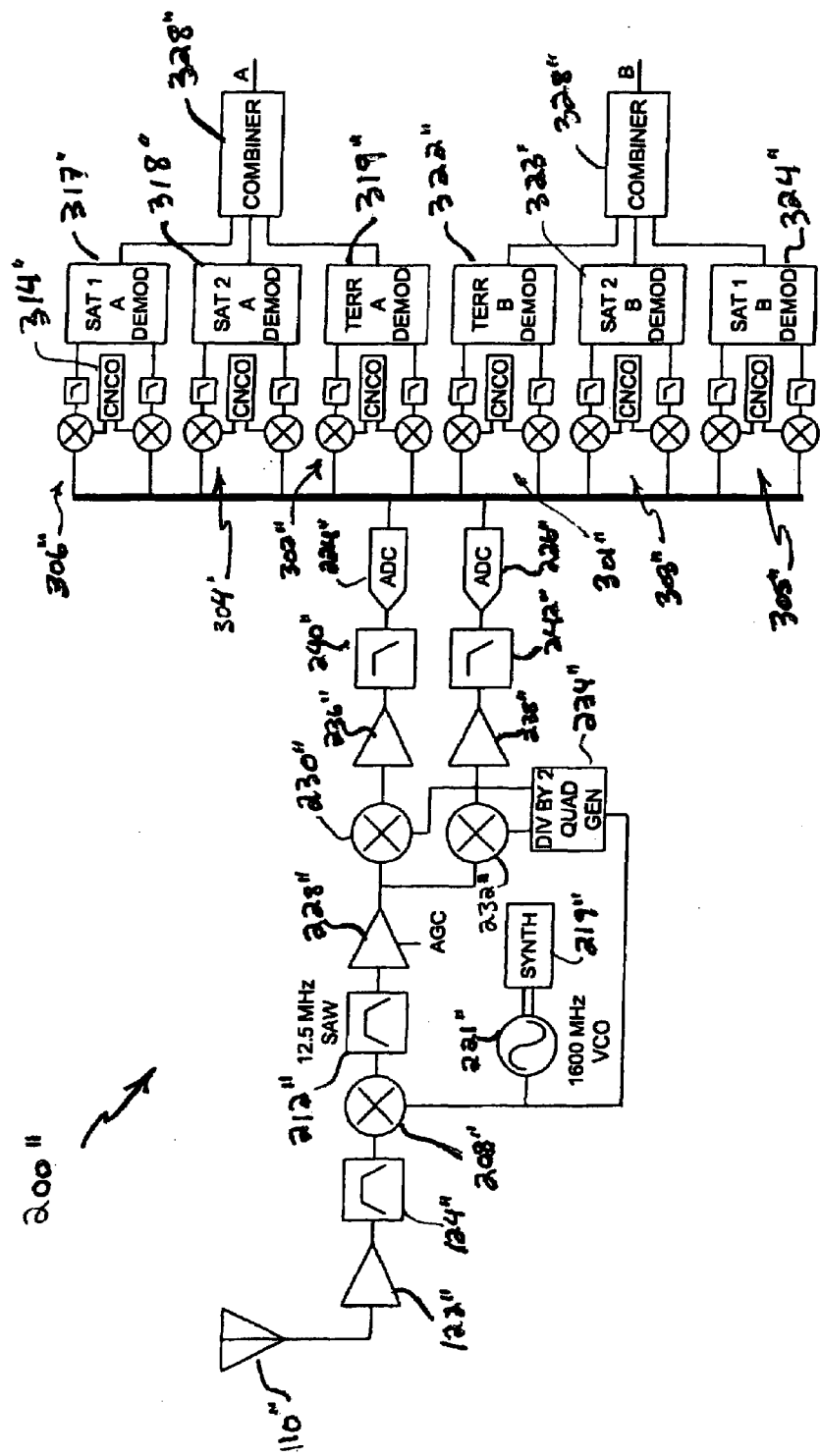
FIG. 9 is a block diagram of second alternative embodiment of the SDARS receiver of the present invention.

FIG. 9 is a block diagram of second alternative embodiment of the SDARS receiver of the present invention. The embodiment of FIG. 9 is essentially the same as that of FIG. 7 with the exception that each channel of each ensemble is provided for separately. That is, instead of simply returning each CNCO from one ensemble to the other, three additional branches are provided 301", 303", and 305" and each CNCO 314 is tuned to a different channel for a single ensemble. With additional demodulators 322", 323", and 324" and an additional combiner 328" the system is capable of receiving both ensembles simultaneously. Both ensembles are received simultaneously without replication of the front-end circuitry including SAW filters, synthesizers and analog mixers. Another advantage of the architecture of FIG. 9 is that the signal processing is implemented in the preferred embodiment in digital complementary metal-oxide semiconductor (CMOS) technology. Those skilled in the art will appreciate that a significant advantage of a digital CMOS implementation resides in the fact that a digital CMOS implementation is on a very fast cost reduction path.

FIG. 10 is a block diagram of an alternative preferred embodiment of an SDARS receiver incorporating the teachings of the present invention. The receiver architecture 200''' of FIG. 10 is similar to the receiver architecture 200" of FIG. 9 with the exception that the receiver architecture 200''' of FIG. 10 is a direct conversion architecture in which the SAW filter 212" of FIG. 9 is eliminated. In addition, instead of using two local oscillators as per FIG. 9, the architecture of FIG. 10 employs a single local oscillator 221''' which is driven to operate at twice the received frequency (e.g. 4800 Mhz in the illustrative embodiment) by a synthesizer 219''' to provide a stable reference. (Those skilled in the art will appreciate that a crystal may be used for injection instead of a synthesizer, without departing from the scope of the present teachings, where the ability to move the reference frequency is not required.) The signal received by the antenna 110''' is amplified by a low noise amplifier 122''', input to a selectivity filter 124''', amplified by an AGC amplifier 228''' and applied to a quadrature mixers 230''' and 232'''. Similar to the architecture of FIG. 9, the gain of amplifier 228 is controlled by signal amplitude control stages (not shown) contained in demodulator blocks 317, 318, 319, 322, 323 and 324.

In the quadrature mixers 230''' and 232''', the RF signal, received at 2.4 GHz in the illustrative embodiment, is mixed with the 2.4 GHz quadrature local oscillator signals developed in quadrature generator 234''' by dividing down the 4.8 GHz local oscillator signal. Consequently, the received RF signal is converted directly to baseband. With the direct conversion architecture of FIG. 10, no image filter is required (as would be the case with the superheterodyne receivers of FIGS. 7, 8 and 9) because the received signal is converted directly from RF frequency to baseband.

In each embodiment, the synthesizer 219 outputs a reference frequency in response to the system controller 500 of FIG. 5 and thereby selects the XM radio band or the CD radio band of the digital broadcast spectrum as discussed above.

Returning to FIG. 10, the outputs of the quad mixers 230''' and 232''' are applied to post mixer amplifiers 236''' and 238''' and low pass filters 240''' and 242'''. The low pass filters must be designed to handle the aliasing components which may be expected to result from an analog-to-digital conversion process implemented by ADCs 224''' and 226'''. Low pass filters 240''' and 242''' will require a steeper rolloff than the low pass filters of FIG. 9, where additional anti-aliasing protection is available from SAW filter 212". The output of the ADCs is a complex bit stream for processing in the manner described above with reference to FIGS. 8 and 9.

The architecture of FIG. 10 allows for the pursuit of improvements with respect to the tuner and the digital back end separately via a common interface 340'''.

Those skilled in the art appreciate that analog mixing of RF signals to complex baseband for digital conversion has inherent limitations related to the dynamic range of the input signals. In practice, these limitations often steer the receiver designer to digital conversion at an intermediate frequency, as described in the architecture of FIG. 6, at the expense of higher cost and size. One such limitation of mixing analog signals to baseband is second order intermodulation products generated in the baseband mixers and post mixer amplifiers. These undesired products develop when two RF (or IF) signal components (f1 and f2) present at the mixer input self mix and the difference product (f1−f2) falls at baseband. If the amplitude of the difference product is sufficiently large, destructive interference with the desired baseband signal occurs. With the architecture of FIG. 7, SAW filter 212 protects the baseband mixers from strong interfering signals outside the XM band, which can create second order intermodulation products. Within the XM band, signals received from the satellites will have low signal amplitude which will not generate significant second order intermodulation products. In the scenario where the receiver is in close proximity to a terrestrial repeater, the repeater signal amplitude may be sufficient to generate significant second order intermodulation products. However, since the repeater signal contains program content identical to the satellite signal, in the event second order intermodulation products from the repeater interfere with the satellite signal, the signal recovered from the repeater will have more than sufficient amplitude to insure an error free bitstream is available to the end user.

With the architecture of FIG. 10, the SAW filter is eliminated and close-in selectivity for second order intermodulation protection from out of band signals is not available. However, by direct translation of the full XM frequency band to 0 Hz, the low amplitude satellite signals are isolated in frequency from most second order intermodulation products generated from out-of-band single carrier interferers, such as MCM carriers. This is evident by referring to the frequency plan of FIG. 3b. Since the satellite 14 and satellite 12 receive slots are centered at ±3.45 MHz and ±5.29 MHz, after digital translation the satellite signals may be separated from lower frequency intermodulation products with the digital complex mixers and low pass filters described previously.

A second limitation of analog mixing of RF signals to baseband is illustrated in FIG. 11. In FIG. 11a, two RF signals, S1 and S2, centered at frequencies F1 and F2, respectively, are depicted with S2 having substantially larger amplitude than S1. Assuming S1 and S2 exist in the digital domain, FIG. 11a demonstrates the benefits of digital conversion to baseband. In FIG. 11b, a complex digital mixer has recentered the frequency band containing S1 and S2 to 0 MHz. Since digital mixers behave similar to ideal mixers, a substantially ideal replication of the RF spectrum exists at complex baseband after the digital frequency translation.

As depicted in FIG. 11c, the conversion of RF signals S1 and S2 to baseband using analog conversion results in the creation of images about 0 Hz axis due to gain and/or phase imbalance in the I and Q complex signal paths. The imbalance may be due to many causes including imperfect device matching, layout asymmetries, mechanical and process variations in present production RF circuit technology. Best case I/Q matching with standard pipolar integrated circuit processing results in a minimum image attenuation in the range of 30-40 dB. Referring back to the example depicted in FIG. 11c, the image of the large amplitude signal S2 creates destructive interference for the small signal S1. Those skilled in the art appreciate that a receiver operating in a typical land mobile environment will encounter substantially large signal amplitude variations due to the varied proximity to terrestrial transmitters. A receiver architecture for multiple signal reception which includes an analog conversion to baseband stage would yield unacceptable interference protection due to the limited image rejection problem described above. The inventive receiver overcomes this limitation by symmetrically positioning the satellite signals about the 0 Hz axis. Since the XM satellite signals (or CD Radio satellite signals) are received on the ground with low margin (normally less than 15 dB), the signal dynamic range is limited such that the image created by a maximum amplitude satellite signal will not interfere with a low level satellite signal received at the minimum amplitude for detection.

FIG. 12 is a diagram showing an XM full waveform receiver adapted to receive audio and data simultaneously. The signal from antenna 110'' is received by the receiver 200''' of FIG. 10 or the receiver 200'' of FIG. 9. The outputs of the receiver 200''' are first and second time-division multiplexed bitstreams A and B with approximately 100 channels of audio content and a number of data channels. The bitstreams are input to two types of demultiplexors broadcast 2010 and 2020 and data 2030 and 2040. Through a switch 2050, the user is able to select a broadcast channel from either ensemble A or B for listening pleasure as well as a data channel for informational purposes.

Returning briefly to FIG. 5, in the channel decoder IC the output of the combiner 328 is input to a service layer decoder 330. In the service layer 330, a demultiplexor 332 decrypts and extracts the desired channel information and provides digital audio and data to a separate source decoder 400. The source decoder 400 provides digital audio to a digital-to-audio converter which applies an analog signal to an audio amplifier 840 and a speaker 860. The data may be sent to a separate data interface 700 for external output or internal use. The system controller 500 has a man-machine interface 540 that controls the user interface 1000. The interface 1000 also allows a user to control a conventional AM/FM radio, CD player or tape, the output of which is provided to the speaker 860 via the DAC 830 and amplifier/multiplexer 840.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A receiver comprising:
   first means for receiving signals in a first band, said first band including multiple carriers;
   second means for downconverting said received signals in the first band;
   third means for receiving signals in a second band, simultaneous with the reception of signals in said first band, said second band including multiple carriers;
   fourth means for downconverting signals in the second band; and
   fifth means for selectively outputting signals from the first band or the second band.

2. The invention of claim 1 wherein the first band is the XM band.

3. The invention of claim 1 wherein the second band is the CD band.

4. The invention of claim 1 wherein the first and the third means is a radio frequency antenna.

5. The invention of claim 4 wherein the output of the antenna is input to a filter.

6. The invention of claim 5 wherein the filter is an image filter.

7. The invention of claim 5 wherein the filter is a selectivity filter.

8. The invention of claim 4 wherein the second means and the fourth means is a mixer.

9. The invention of claim 8 wherein the mixer is driven by a voltage controlled oscillator.

10. The invention of claim 9 wherein the voltage controlled oscillator is driven by a synthesizer.

11. The invention of claim 10 wherein the fifth means includes a controller.

12. The invention of claim 11 wherein the synthesizer is controlled by the controller to cause said receiver to selectively output signals received in the XM band or the CD band.

13. The invention of claim 11 further including means for digitizing the output of the mixer.

14. The invention of claim 13 further including means for simultaneously receiving first and second ensembles, said first ensemble including a first signal from a first source, a first signal from a second source and a first signal from a third source and said second ensemble including a second signal from said first source, a second signal from said second source and a second signal from said third source.

15. The invention of claim 14 further including means for selectively outputting signals transmitted within said first and said second ensembles.

16. The invention of claim 13 further including means for outputting an audio signal along with a data signal.

17. The invention of claim 1 further including means for outputting an audio signal along with a data signal.

18. An interoperable receiver comprising:
first means for receiving signals in an XM band;
second means for downconverting said received signals in the XM band;
third means for receiving signals in a CD band;
fourth means for downconverting signals in the CD band; and
control means for selectively outputting signals from the XM band or the CD band.

19. The invention of claim 18 further including means for simultaneously receiving first and second ensembles, said first ensemble including a first signal from a first source, a first signal from a second source and a first signal from a third source and said second ensemble including a second signal from said first source, a second signal from said second source and a second signal from said third source.

20. The invention of claim 19 further including means for selectively outputting signals transmitted within said first and said second ensembles.

21. The invention of claim 20 further including means for outputting an audio signal along with a data signal.

22. The invention of claim 18 further including means for outputting an audio signal along with a data signal.

23. A receiver comprising:
first means for simultaneously receiving first and second dissimilar ensembles, each ensemble having multiple carriers on which multiple signals are modulated and
second means for processing said first and said second ensembles to selectively output said signals.

* * * * *